March 14, 1967 P. E. HARRIS ETAL 3,309,618
POSITIVE-FEEDBACK BOXCAR CIRCUIT
Filed July 27, 1964 3 Sheets-Sheet 1

INVENTORS.
PAUL E. HARRIS
B. EUGENE SIMMONS
BY Philip Schneider
Louis B. Applebaum
ATTORNEYS

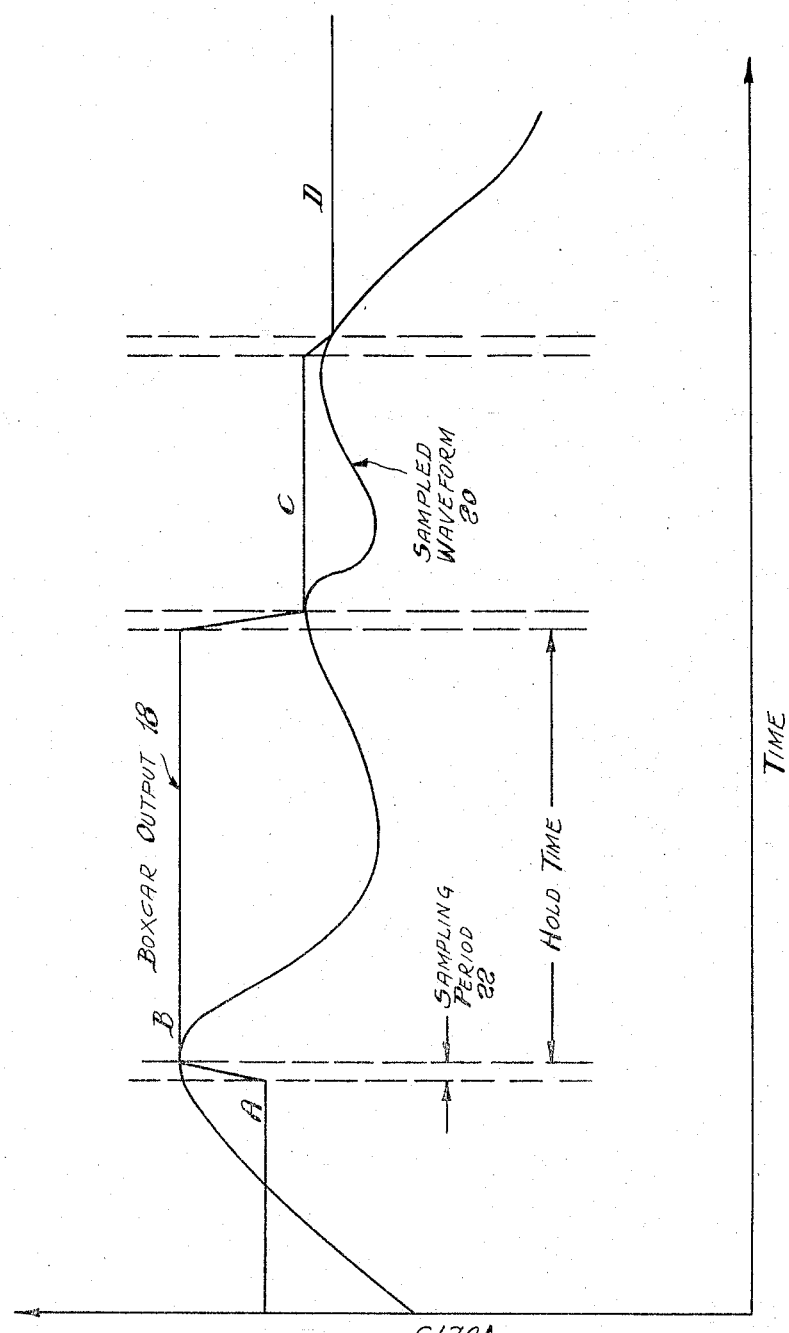

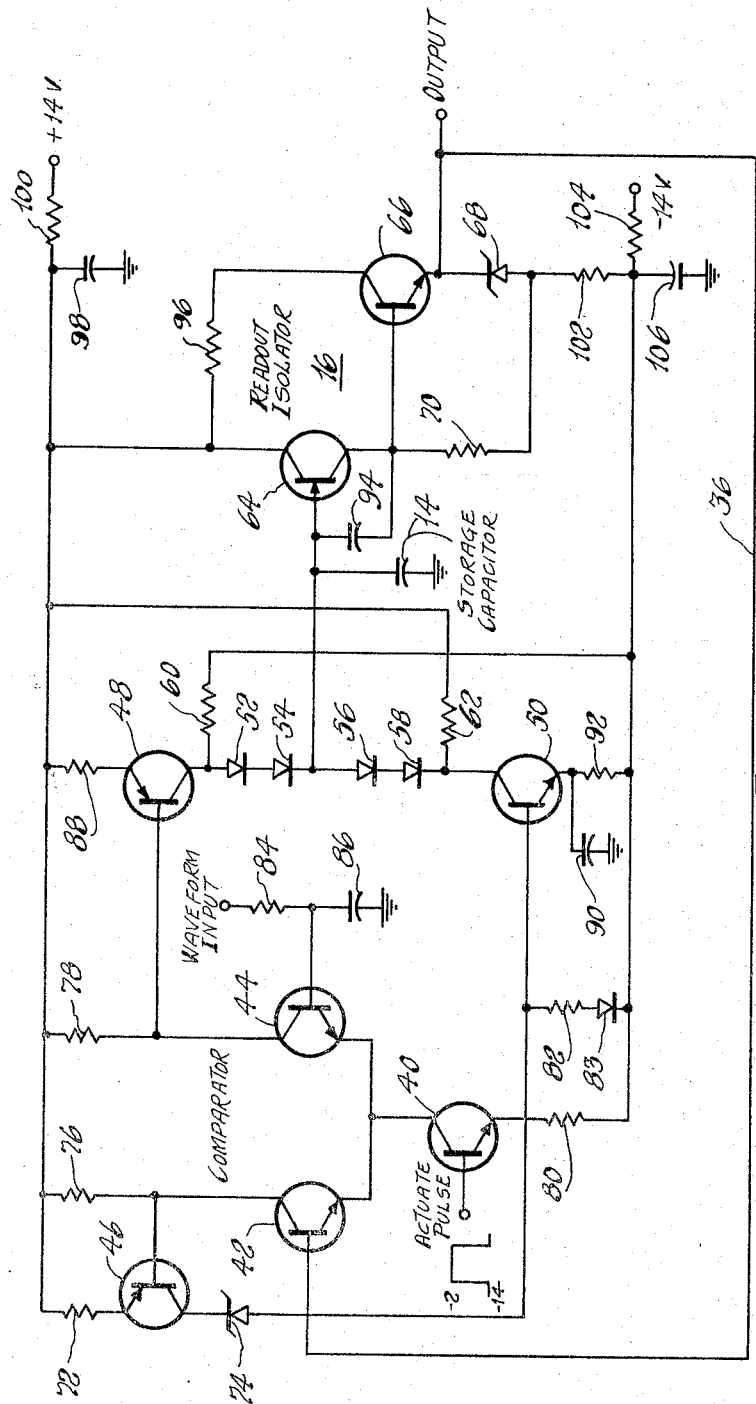

United States Patent Office 3,309,618
Patented Mar. 14, 1967

3,309,618
POSITIVE-FEEDBACK BOXCAR CIRCUIT
Paul E. Harris, Syracuse, and Bower Eugene Simmons, Fayetteville, N.Y., assignors, by mesne assignments, to the United States of America as represented by the Secretary of the Navy
Filed July 27, 1964, Ser. No. 385,529
12 Claims. (Cl. 330—69)

This invention relates to boxcar circuits and particularly to radar boxcar circuits in which positive feedback is employed to minimize errors.

The boxcar circuit, or zero-order hold circuit, is a device for sampling voltage waveforms and storing the latest sampled value. Boxcar circuits may employ digital storage, magnetic-flux storage, electric-charge storage, or other storage means.

In general, radar boxcars (boxcar circuits generally used in radar applications) are fast, a typical sampling time being approximately one microsecond, but suffer from D.-C. offset voltages unstable by perhaps 0.2 volt, the offset voltages being independent of hold time. On the other hand, computer boxcars utilizing operational amplifiers provide better accuracy but tend to be slower. The accuracy is achieved by the use of negative feedback.

The origins of inaccuracy in the radar boxcar stem from "droop" ("droop" refers to slow leakage of the stored charge) and from D.-C. offset voltage which occur within the boxcar and tend to be unstable with time. Such instabilities may be associated with temperature sensitivity of components, aging of components, and imperfect control of power supply voltage and currents. In a conventional radar boxcar circuit, which comprises an electronic switch, a storage capacitor and a readout isolator stage in series, offset voltages of approximately 0.5 volt (i.e. a grid-to-cathode voltage or a solidstate "bandgap") with long-term instabilities of several tenths of a volt occur across both the boxcar switch and the readout isolator. Droop error, on the other hand, even 500 microseconds after a ½ microsecond sample, is only 10 millivolts.

Thus, the primary inaccuracy in the radar boxcar is not droop (which is an A.-C. or sample-to-sample error) but rather the instability of D.-C. voltage offsets.

The present invention solves the problem of instability in D.-C. voltage offsets by utilizing positive feedback to force the boxcar output voltage to equal the input voltage during the course of sampling. In a typical embodiment of the present invention, the boxcar input voltage is connected to one input terminal of a difference amplifier (comparator), and the boxcar output voltage is fed back positively to the other input terminal. The difference amplifier output is then used to control the charging of a storage capacitor. By turning on (gating) the difference amplifier during the sampling interval, the boxcar output is made to equal the value of the input waveform at that time.

An object of this invention is to improve the D.-C. accuracy of so-called "radar" boxcar circuits.

Another object is to permit the increase of size of the storage capacitor in these circuits, thereby decreasing the amount of droop therein.

Other objects and many of the attendant advantages of this invention will be readily appreciated as the same becomes better understood by reference to the following detailed description when considered in connection with the accompanying drawings wherein:

FIG. 2 is a diagram illustrating the relationship of the boxcar output signal to the input (sampled) waveform;

FIG. 4 is a schematic wiring diagram of circuits which can be employed within the blocks of FIG. 3.

Figure 1:
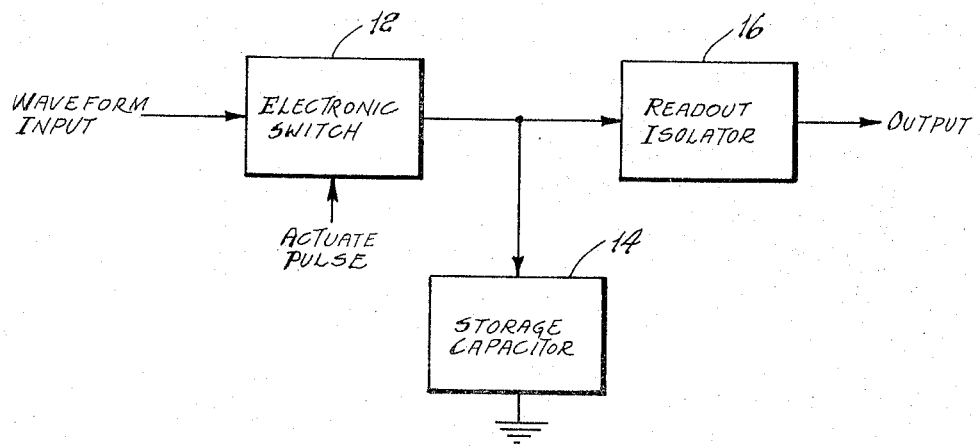
FIG. 1 is a schematic block diagram of a conventional radar boxcar circuit.

The schematic block diagram of a conventional radar boxcar circuit is shown in FIG. 1. The electronic switch 12 is gated on by an actuating pulse, thereby permitting the storage capacitor 14 to be charged to the value of the input waveform. The capacitor 14 remains charged at this D.-C. sampling value until the next sampling period (period of the actuating pulse). A buffer amplifier called a readout isolator 16 separates the storage capacitor 14 from the output terminal and its function is to isolate the storage capacitor 14 so that the very process of reading the value of its stored voltage does not significantly decrease this value.

FIG. 2 shows the relation of the boxcar output signal 18 to the input, or sampled, waveform 20. During the first sampling period 22, the storage capacitor 14 charges from voltage level A to voltage level B, the latter voltage being that of the input waveform 20 during the sampling period 22. The storage capacitor 14 then holds at this level (neglecting droop) until the next sampling period when it discharges to voltage level C. The boxcar output is thus a series of constant-level steps corresponding to the values of the input waveform during the sampling periods.

Figure 3:
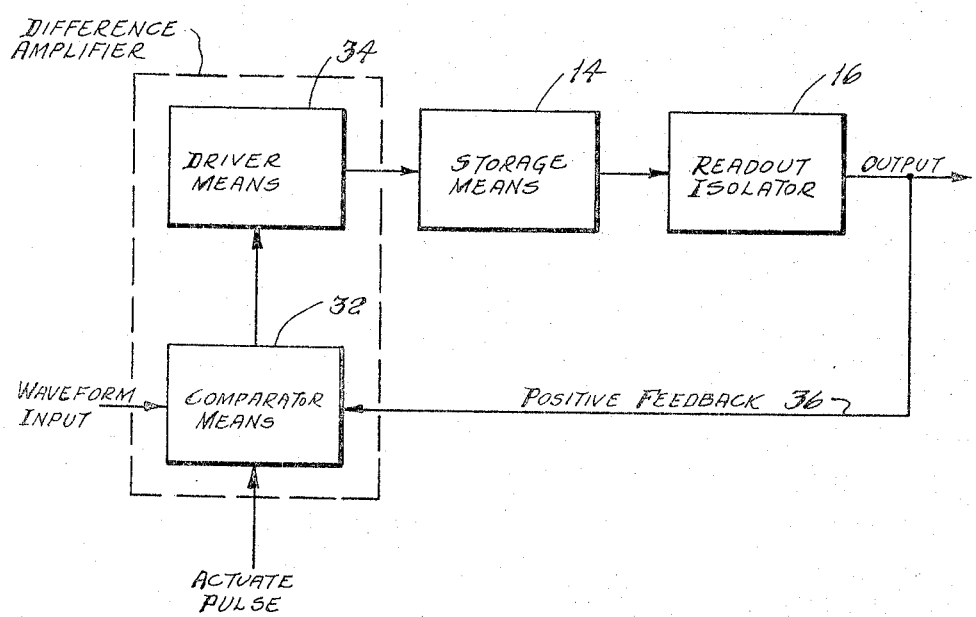
FIG. 3 is a schematic block diagram of an embodiment of the invention.

The block diagram of the present invention is shown in FIG. 3. The electronic switch 12 of FIG. 1 is replaced by comparator means 32 and driver means 34. The comparator means 32 and driver means 34 are normally cut off but function when an actuating, or gating, pulse is applied. Thus, the functions of th comparator and driver means include the switching function.

Positive feedback from the output of the readout isolator 16 to the input of the comparator means 32 is provided by lead 36. The comparator means 32 and driver means 34 actually comprise a difference amplifier which compares the value of the input waveform with that of the output waveform during the sampling period and controls the charge or discharge of the storage means 14 in accordance with the difference in voltage value between input and output waveforms. It is important to note that the voltage against which the input waveform is compared is the waveform at the output terminal, not the actual voltage on the storage capacitor 14. Thus, long-term instabilities which occur in the circuit after the storage capacitor 14 do not affect the actual output voltage.

A typical embodiment of the invention is illustrated in FIG. 4. The comparator 32 comprises the circuits of transistors 40, 42 and 44. Transistors 42 and 44 are cut off when transistor 40 is cut off since the collector currents of transistors 42 and 44 must flow through transistor 40. Transistor 40 comprises a constant-current device which conducts when an actuating pulse is applied to its base. Transistors 42 and 44 are amplifying transistors.

The driver means 34 comprises transistors 46, 48 and 50 and their associated circuits, which include disconnect diodes 52 and 54, and 56 and 58, respectively. The difference in the voltages applied to the bases of transistors 44 and 42, which correspond respectively to the input and output waveform voltage levels, controls the charging or discharging of the storage capacitor 14. The storage capacitor 14 charges or discharges until its voltage, which is the output voltage level, is equal to the input voltage level.

Transistors 40, 42 and 44 and their associated circuits serve as the comparator means, of which transistor 40 is a gated, constant-current source controlled in its conduction by the actuating pulse. The equality of base-emitter voltages of transistors 42 and 44 is essential to elimination of D.-C. offset voltage between circuit input and output. The effect of all other circuit components upon readout accuracy is insignificant. Accuracy of 10 millivolts may be achieved without transistor selection; however, preservation of accuracy over a wide temperature range makes desirable substitution of a matched transistor pair within the same case for transistors 42 and 44. Such matched pairs are commercially available.

Transistors 46, 48 and 50 and their associated circuits comprise the driver means 34. Polarity and magnitude of charging current are controlled by the voltages obtained at the collectors of transistors 42 and 44. The storage capacitor 14 is driven by the collectors of transistors 48 and 50 through the disconnect diodes 52, 54, 56 and 58. Transistor 46 serves as a phase inverter to apply the polarity to the base of transistor 50. During the interval between sampling (actuating) pulses, the collector currents of transistors 48 and 50 are reduced to zero. The biasing resistors 60 and 62 reverse-bias the disconnect diodes 52, 54, 56 and 58, thus disconnecting the driver means 34 from the storage capacitor 14. If the collector leakage currents of transistors 48 and 50 were sufficiently low, the disconnect diodes would not be needed. The only function of capacitors other than the storage capacitor 14 and power supply bypass capacitors is to prevent parasitic oscillations which might otherwise occur in the circuits. The disconnect diodes are series connected to provide both short recovery time and extremely high back resistance.

The readout isolator 16 is comprised of transistors 64 and 66 and their associated circuits. Transistor 64 is a field-effect transistor; transistor 66 is a conventional transistor. The actual transistor chosen for transistor 64 was selected because of its extremely low gate leakage current. Diode 68 is a Zener diode and together with resistor 70 insures a nearly constant-current load for the field-effect transistor 64, thus causing the field-effect transistor stage to act as an isolation circuit.

Diode 74, another Zener diode, is employed in effect as a voltage source to avoid breakdown of the collector of transistor 46.

The operation of the comparator and driver means is as follows:

During the hold period, transistor 40 has −14 volts at both its base and emitter and therefore is cut off. This cuts off transistors 42, 44, 46, 48 and 50. The biasing resistors 60 and 62 place −14 volts on the anode of disconnect diode 52 and +14 volts on the cathode of disconnect diode 58 thereby reverse biasing the four disconnect diodes.

During the sampling period, the actuating pulse turns on constant-current transistor 40. The emitters of transistors 42 and 44 are now at the same potential. If the voltage at the output terminal (therefore the voltage at the base of 42) is the same as the input voltage (therefore the voltage at the base of 44), the currents through transistors 42 and 44 will be equal, thereby causing the currents through transistors 48 and 50 to be equal. The current through transistor 48 can be considered to be the charging current of the storage capacitor 14 and the current through transistor 50 the discharge current of the capacitor. If the currents through these transistors are equal, the capacitor simply maintains whatever charge it has.

Suppose now that the input voltage at the base of transistor 44 is less than (less positive than) the output voltage at the emitter of transistor 66. The current through transistor 44 now decreases in comparison with the current through transistor 42. Decrease of current through resistor 78 raises the voltage at the base of transistor 48, thereby decreasing the current through this transistor (PNP). On the other hand, increase of current through transistor 42 decreases the voltage at the base of transistor 46, thereby increasing the current through this transistor and also increasing the current the same amount through transistor 50. Thus, the current through transistor 48 is now smaller than the current through transistor 50 so that the storage capacitor 14 discharges until the output voltage equals the input voltage, at which time the currents through transistors 42 and 44 are equal, and also the currents through transistors 48 and 50 are equal.

The difference in the currents through transistors 48 and 50, which constitutes the output signal of the difference amplifier, comprises the charge or discharge current of the storage capacitor 14 and is proportional to the difference between the values of the input and the output signal.

Since the output terminal is part of the feedback loop, capacitive loading should be limited to a few hundred picofarads. Excessive capacitive loading may result in oscillation.

The feedback technique used here offers the following advantages in a capacitor-storage boxcar circuit:

(1) Since the input waveform does not directly charge the capacitor but instead controls its charge, the input is well isolated from the storage capacitor both during the held time and the sampling time.

(2) A larger storage capacitor can be used, thus decreasing the capacitor voltage droop as compared to the conventional radar boxcar. The larger capacitor is feasible for a given sampling interval because the driver circuit need not charge the capacitor at an exponentially decreasing rate, which the waveform voltage must do in the conventional boxcar.

(3) Construction of a bipolar driver does not require any pulse transformer or other inductive device. This leads to freedom of choice of sample time, non-critical components in circuit fabrication, and adaptivity of the boxcar construction to miniaturization techniques.

(4) Circuit operation is independent of long-term variations in temperature of power-supply voltages, since the only critical circuit operation is the null performance of the comparison circuit. Several high-performance comparison circuits are known today.

(5) There is no polarity inversion (as in a computer boxcar circuit, for example). The stored output is equal, both in magnitude and polarity, to the sampled input.

Typical values for the component of the embodiment of the invention illustrated in FIG. 4 are:

Transistors:
| | |
|---|---|
| 40, 42, 44, 66 | 2N744 |
| 46, 48 | 2N2412 |
| 64 | FSP401 |

Diodes:
| | |
|---|---|
| 74 | 1N758 |
| 83 | 1N660 |
| 52, 58 | FD300 |
| 54, 56 | 1N916A |
| 68 | 1N754 |

Capacitors:
| | | |
|---|---|---|
| 14 | pf | 2000 |
| 86 | pf | 100 |
| 90 | pf | 56 |
| 94 | pf | 20 |
| 98, 106 | μf | 10 |

Resistors:
| | | |
|---|---|---|
| 72, 82, 88, 92 | ohms | 220 |
| 76, 78 | K | 1 |
| 80 | K | 1.5 |
| 84 | ohms | 100 |
| 60, 62 | K | 47 |
| 70 | K | 68 |
| 96 | ohms | 470 |
| 100, 104 | do | 20 |
| 102 | K | 2.2 |

Obviously many modifications and variations of the present invention are possible in the light of the above teachings. It is therefore to be understood that within the scope of the appended claims the invention may be practiced otherwise than as specifically described.

We claim:

1. A boxcar circuit comprising, in combination:
   difference amplifier means operating in response to a gating pulse for comparing the values of an input signal and a feedback signal and producing a difference signal proportional to the difference between said values;
   storage means connected to said difference amplifier means for storing energy in proportion to said difference signal;
   an output terminal;
   isolation means connected between said output terminal and said storage means for transmitting to said output terminal a signal proportional to the energy stored in said storage means and for isolating said storage means from loading effects at said output terminal; and
   feedback means connected between said output terminal and said difference amplifier means for feeding back the signal at said output terminal to said difference amplifier means for comparison with said input signal.

2. A boxcar circuit as set forth in claim 1, further including disconnect means connected to said difference amplifier means and to said storage means for interposing a very high impedance between said difference amplifier means and said storage means whenever said difference amplifier is not operative.

3. A boxcar circuit comprising, in combination:
   difference amplifier means operating in response to a gating pulse for comparing the values of an input signal and a feedback signal and producing a difference signal proportional to said difference between said values;
   capacitive means connected to said difference amplifier means for storing charge in proportion to said difference signal;
   an output terminal;
   isolation means connected between said output terminal and said capacitive means for transmitting to said output terminal a signal proportional to the charge stored in said capacitive means and for isolating said capacitive means from loading effects at said output terminal; and
   feedback means connected between said output terminal and said difference amplifier means for feeding back the signal at said output terminal to said difference amplifier means for comparison with said input signal.

4. A boxcar circuit as set forth in claim 3, further including disconnect means connected to said difference amplifier means and to said capacitive means for interposing a very high impedance between said difference amplifier means and said capacitive means whenever said difference amplifier is not operative.

5. A boxcar circuit comprising, in combination:
   difference amplifier means comprising comparator means and driver means, said difference amplifier means operating in response to a gating signal, an input signal and the output signal of said boxcar circuit being fed to said comparator means, the output signal of said driver means being a difference signal which is proportional to the difference in value between said input signal and said boxcar output signal;
   storage means connected to said driver means for storing energy in proportion to said difference signal;
   an output terminal;
   isolation means connected between said output terminal and said storage means for transmitting to said output terminal a signal proportional to the energy stored in said storage means and for isolating said storage means from loading effects at said output terminal; and
   feedback means connected between said output terminal and said comparator means for feeding back the signal at said output terminal to said comparator means for comparison with said input signal.

6. A boxcar circuit as set forth in claim 3, further including
   disconnect means connected to said driver means and to said storage means for interposing a very high impedance between said driver means and said storage means whenever said difference amplifier means is not operative.

7. A boxcar circuit comprising, in combination:
   difference amplifier means comprising comparator means and driver means, said difference amplifier means operating in response to a gating signal, an input signal and the output signal of said boxcar circuit being fed to said comparator means, the output signal of said driver means being a difference signal which is proportional to the difference in value between said input signal and said boxcar output signal;
   capacitive means connected to said driver means for storing charge in proportion to said difference signal;
   an output terminal;
   isolation means connected between said output terminal and said capacitive means for transmitting to said output terminal a signal proportional to the charge stored in said capacitive means and for isolating said capacitive means from loading effects at said output terminal; and
   feedback means connected between said output terminal and said comparator means for feeding back the signal at said output terminal to said comparator means for comparison with said input signal.

8. A boxcar circuit as set forth in claim 7, further including
   disconnect means connected to said driver means and to said capacitive means for interposing a very high impedance between said driver means and said capacitive means whenever said difference amplifier means is not operative.

9. A boxcar circuit comprising, in combination:
   difference amplifier means including gating means operating in response to a gating pulse for comparing the values of an input signal and a feedback signal and producing a difference signal proportional to the difference between said values;
   storage means connected to said difference amplifier means for storing energy in proportion to said difference signal;
   an output terminal;
   isolation means connected between said output terminal and said storage means for transmitting to said output terminal a signal proportional to the energy stored in said storage means and for isolating said storage means from loading effects at said output terminal; and
   feedback means connected between said output terminal and said difference amplifier means for feeding back, with positive polarity, the signal at said output terminal to said difference amplifier means for comparison with said input signal.

10. A boxcar circuit comprising, in combination:
    difference amplifier means including gating means operating in response to a gating pulse for comparing the values of an input signal and a feedback signal and producing a difference signal proportional to said difference between said values;
    capacitive means connected to said difference amplifier means for storing charge in proportion to said difference signal;

an output terminal;

isolation means connected between said output terminal and said capacitive means for transmitting to said output terminal a signal proportional to the charge stored in said capacitive means and for isolating said capacitive means from loading effects at said output terminal; and feedback means connected between said output terminal and said difference amplifier means for feeding back, with positive polarity, the signal at said output terminal to said difference amplifier means for comparison with said input signal.

11. A boxcar circuit comprising, in combination:

difference amplifier means comprising comparator means, gating means and driver means, said difference amplifier means operating in response to a gating signal, an input signal and the output signal of said boxcar circuit being fed to said comparator means, the output signal of said driver means being a difference signal which is proportional to the difference in value between said input signal and said boxcar output signal;

storage means connected to said driver means for storing energy in proportion to said difference signal;

an output terminal;

isolation means connected between said output terminal and said storage means for transmitting to said output terminal a signal proportional to the energy stored in said storage means and for isolating said storage means from loading effects at said output terminal; and feedback means connected between said output terminal and said comparator means for feeding back, with positive polarity, the signal at said output terminal to said comparator means for comparison with said input signal.

12. A boxcar circuit comprising, in combination:

difference amplifier means comprising comparator means, gating means and driver means, said difference amplifier means operating in response to a gating signal, an input signal and the output signal of said boxcar circuit being fed to said comparator means, the output signal of said driver means being a difference signal which is proportional to the difference in value between said input signal and said boxcar output signal;

capacitive means connected to said driver means for storing charge in proportion to said difference signal;

an output terminal;

isolation means connected between said output terminal and said capacitive means for transmitting to said output terminal a signal proportional to the charge stored in said capacitive means and for isolating said capacitive means from loading effects at said output terminal; and feedback means connected between said output terminal and said comparator means for feeding back, with positive polarity, the signal at said output terminal to said comparator means for comparison with said input signal.

References Cited by the Examiner

UNITED STATES PATENTS 3,011,129  11/1961  Magleby et al. _____ 328—58 X
3,077,566   2/1963  Vosteen _____ 330—30 X ROY LAKE, *Primary Examiner.*

N. KAUFMAN, *Assistant Examiner.*